United States Patent [19]

Kay et al.

[11] Patent Number: 5,896,445
[45] Date of Patent: Apr. 20, 1999

[54] INCOMING CALL TRACKING WITH INTERACTIVE DATA COLLECTION

[75] Inventors: William A. Kay, Glendora, N.J.; Dorsey P. Brown, Cochranville, Pa.; David A. Dague, Middletown; Barry P. Pershan, Olney, both of Md.; Lisa M. Phillips, Reston, Va.

[73] Assignee: Bell Atlantic Network Services, Inc., Arlington, Va.

[21] Appl. No.: 08/622,355

[22] Filed: Mar. 27, 1996

Related U.S. Application Data

[63] Continuation-in-part of application No. 08/590,295, Jan. 23, 1996, Pat. No. 5,754,634.

[51] Int. Cl.$^6$ .................................................. H04M 15/00
[52] U.S. Cl. ........................... 379/135; 379/134; 379/113
[58] Field of Search .................................... 379/127, 135, 379/142, 188–189, 196–199, 201, 34, 113, 265–266, 133–134, 111–112

[56] References Cited

U.S. PATENT DOCUMENTS

| | | | |
|---|---|---|---|
| 5,097,528 | 3/1992 | Gursahaney et al. | 379/201 |
| 5,231,593 | 7/1993 | Notess . | |
| 5,243,543 | 9/1993 | Notess . | |
| 5,402,474 | 3/1995 | Miller et al. . | |
| 5,422,941 | 6/1995 | Hasenauer et al. | 379/207 |
| 5,425,087 | 6/1995 | Gerber et al. . | |
| 5,497,414 | 3/1996 | Bartholomew | 379/142 |
| 5,509,055 | 4/1996 | Ehrlich et al. | 379/111 |
| 5,684,868 | 11/1997 | Alexander | 379/34 |

FOREIGN PATENT DOCUMENTS

WO 96/38971   12/1996   WIPO .

*Primary Examiner*—Curtis A. Kuntz
*Assistant Examiner*—Duc Nguyen
*Attorney, Agent, or Firm*—McDermott, Will & Emery

[57] ABSTRACT

A method and system is disclosed for tracking call transaction data from incoming telephone calls, including attempted calls that have not been completed, made to individual predetermined subscribers during a defined time period. Information, including demographic breakdowns of calls, such as time of day, day of week, location of origin, etc. is reported automatically by the system. Through the use of the Advanced Intelligent Network (AIN) and Integrated Service Control Point (ISCP) platform, call transaction data for incoming calls are captured in response to terminating triggers at Service Switching Points (SSPs). The call originating phone number for each call may be used to access an existing telephone system billing database, called Customer Record Information System (CRIS), to obtain caller information, including zip code. The zip code, in turn, can be used to access a commercially available census data base to provide further demographic information. Report statistics can match these demographics with the number of calls received as collected at the ISCP. The arrangement additionally provides for identifying first time callers and the collection of data relevant to each call obtained in an interactive manner from the called subscriber.

23 Claims, 7 Drawing Sheets

Fig. 3
| Terminating Call Number | Originating Call Number | Date | Time |
|---|---|---|---|
|  |  |  |  |
|  |  |  |  |
| . | . | . | . |
| . | . | . | . |
| . | . | . | . |
|  |  |  |  |
Fig. 5
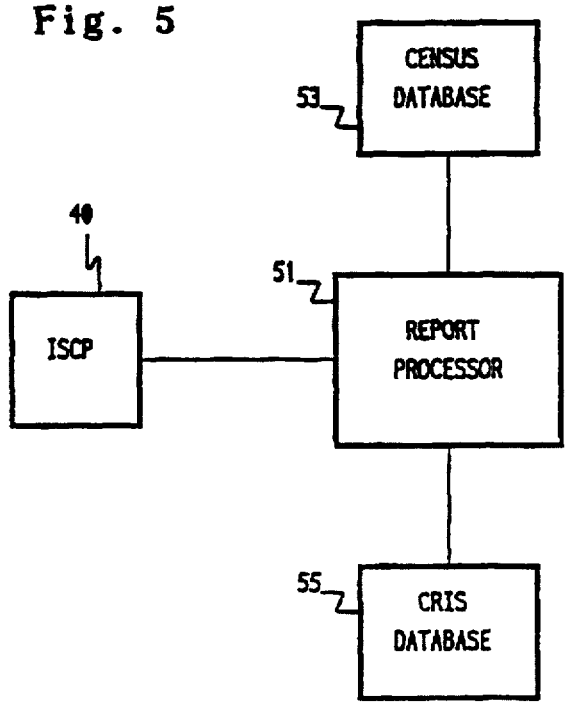
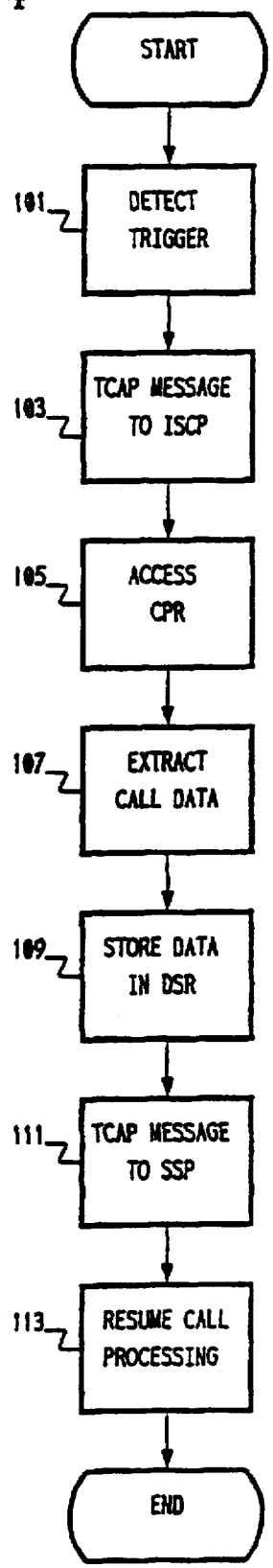
Fig. 4

Fig. 6A

| Day of Week Results | | | |
|---|---|---|---|
| Day of Week | Number of Calls | Average Calls/Day | % of Calls |
| Monday | | | |
| ⋮ | ⋮ | ⋮ | ⋮ |
| Sunday | | | |
| Total | | | 100.0% |

Fig. 6B

| Time of Day Results | | |
|---|---|---|
| Time Range | Number of Calls | % of Calls |
| 9am-10am | | |
| ⋮ | ⋮ | ⋮ |
| 11pm-9am | | |
| Total | | 100.0% |

Fig. 6C

| Zip Code Results | | | | | | | |
|---|---|---|---|---|---|---|---|
| Zip Code | # of Calls (Residential) | % of Calls (Residential) | # of Calls (Business) | % of Calls (Business) | % Home Owners | Median HH Income | Median HH Age |
| xxxxx | | | | | | | |
| | | | | | | | |
| ⋮ | ⋮ | ⋮ | ⋮ | ⋮ | ⋮ | ⋮ | ⋮ |
| | | | | | | | |
| Total | xxx | xxx.x% | xxx | xxx.x% | xxx.x% | xxxxx | xx |

5,896,445

INCOMING CALL TRACKING WITH INTERACTIVE DATA COLLECTION

This is a Continuation-In-Part application of U.S. patent application Ser. No. 08/590,295 filed Jan. 23, 1996, U.S. Pat. No. 5,754,634, entitled "SYSTEM AND METHOD FOR TRACKING AND REPORTING INCOMING CALLS".

TECHNICAL FIELD

The present invention relates to telecommunications networks and more particularly to tracking call transaction data and data received interactively from each incoming call that may be evaluated with respect to user defined parameters.

BACKGROUND ART

Telephone network capabilities have advanced in recent years to include enhanced call routing and completion functions as well as to provide various new information communication services. Such functions and services can now be delivered at great speed and efficiency, even as the volume of network traffic continues to increase at a significant rate. Call transaction data, i.e., information associated with each call, are commonly used to support call processing and to provide accurate billing information.

Various telecommunication configurations have been developed to archive telephone transaction information. For example, U.S. Pat. No. 5,402,474 to Miller et al. discloses a technique for archiving telephone transaction information for inbound and outbound calls. A programmable interface is located between a work station and an archive server that automatically stores information derived from a telephone transaction in a database of records having a plurality of category fields. A host access table, stored in a memory in the workstation, contains programmable commands. An interface program, stored in the workstation memory, executes the commands in the host access table, to perform interfacing functions between the workstation and the archive server, as well as to perform interfacing functions between the host application program and the telephone network. The system utilizes automatic number identification (ANI) to obtain archivable data about the call from the telephone system, from the host computer, and from the customer service agent at the workstation. Such data may be telephone numbers provided by the host computer to the workstation for initiating call placement to the customer's telephone. Each source of data can be automatically archived in the archive server for future billing, auditing and management functions.

U.S. Pat. Nos. 5,231,593 and 5,243,543 to Notess disclose a system for collecting and displaying statistical data for a plurality of local area networks (LANs). Data is collected from remote nodes, each of which is attached to a respective LAN. A LAN driver intercepts all records on the LAN. The records are sent to a collector process where statistics are accumulated into a shared memory area and then transferred to an archive process in a management node. The archiver writes the statistics to a history file and compresses the data. Sampling rates are provided for sampling the various compressed data.

U.S. Pat. No. 5,425,087 to Gerber discloses a system that monitors telephone usage. Various events can be reported to a management information system. These events deal with the length of each call, the length of time that a party was placed on hold, and the telephone number of the other party. The system monitors a line that the telephone company switching system identifies with the directory number to be monitored. Information thereby obtained is provided to a system administrator so that telephone activities of employees, for example, can be monitored in real time.

While existing arrangements permit the gathering of call transaction information for administrative purposes, such as monitoring, processing control and billing, a need exists for making call usage information available to a subscriber in a context that is customized to fulfill the subscriber's particular concerns. For example, subscribers who advertise in the yellow pages or in media campaigns would benefit from a knowledge of how effective such advertising is in helping business. Information such as total volume of incoming calls, and a statistical breakdown of such volume on the bases of day of week, time of day or geographical area of origin for calls placed to the subscriber number during a prescribed time period would be of significant importance. Such information further could be used to develop a statistical demographic representation of the incoming calling population.

Conventionally, however, only telephone bills for phone usage are provided to the subscriber on a periodic basis. Information, such as time, date, length of call, and directory number of the line to which the subscriber was connected, are itemized to explain phone usage charges. Calls so identified are those for which charges are incurred, predominantly outgoing calls and incoming calls for which the subscriber has authorized payment. There is no routine report format for incoming calls that are not being charged to the subscriber. Telephone bills conventionally do not present a breakdown of number and percentage of calls placed to the subscriber by predefined categories. The advertising subscriber has no means to determine total incoming call volume, or the times and places at which the calls are most frequently placed.

Moreover, information about incoming call attempts that may not have been completed would be of significant interest. For example, callers who are placed in a queue during times of call overload may terminate the call before completion to the subscriber station. Attempted calls, even if not completed, are a factor in the measure of advertising effectiveness.

Reports that qualify incoming calls in a finer breakdown also are not conventionally available. In the advertiser illustration, a report containing information in which received incoming calls are classified by the callers' intended purposes would be beneficial to the advertising subscriber. Examples of such categories include calls made for pricing information, calls in which purchase orders were placed, and calls in which reservations were placed. Information comparing the number of repeat callers versus first time callers would provide a basis for evaluating advertising effectiveness. Such effectiveness would be enhanced further by the ability to provide the subscriber, for each call having the caller's consent, information such as the caller's name and address. This information can be used for future follow-up mailing promotions. Systems of the prior art do not unobtrusively provide such information.

DISCLOSURE OF THE INVENTION

Among the advantages of the present invention is the ability provided to an individual telephone subscriber to track information from incoming telephone calls, including attempted calls that have not been completed during a specified time period. Information, including breakdowns of calls, such as time of day, day of week, location of origin, etc., may be reported automatically by the system. Such information is collected automatically from ordinary call transaction data by the system network. Call transaction data is used further to access demographic information from remote databases to formulate a robust report of incoming calls during a monitored time period.

As a further advantage of the invention, the system determines for each incoming call whether that call is the first to be received by the called subscriber from the calling party line. If so, the calling party can be queried interactively for permission to provide individual caller information, such as the identity of the calling party line, to the subscriber. The calling line number can then be used to access appropriate databases to obtain further information, such as name and address. Subsequent calls from the same calling line will be recognized as non-first time calls. In such instances no query will ensue as the response in the first call will have been stored.

Yet another advantage of the present invention is the ability to obtain, interactively from the called subscriber, relevant information about each call after the calling party has completed the call by going to on-hook status. Through the use of account codes previously established and defined in accordance with the subscriber's design, each code entered by the subscriber represents a call category. The codes may represent the type of goods or service offered by the advertising subscriber, whether the purpose of the call was to receive information or to purchase, or other call purposes that the advertising subscriber considers to be of interest. Entered account codes are stored and used to formulate the issued subscriber report.

The present invention meets the needs described above in part through use of the Advanced Intelligent Network (AIN) and Integrated Service Control Point (ISCP) platform to provide call information to those subscribers desirous of such service. A trigger, set at the called subscriber's Service Switching Point (SSP), suspends call completion while an out of band message is sent to the ISCP. The ISCP will capture the date and time of the call, the originating call number and the terminating (subscriber's) call number, before signaling the SSP to resume call processing to complete the call. Thus, information will be obtained for all placed calls, even those that subsequently may not reach the subscriber.

ISCP network data is collected for all calls placed to service subscribers by the AIN platform Data and Reports System (DRS). Subscriber stations need not all be associated with the same Central Office switching system or Signal Transfer Point. DRS is an operations support utility that provides service analysis on the collected data. The data may be sorted on the basis of called subscriber number and transmitted at periodic intervals to a report processor.

The call originating phone number for each call may be used to access an existing telephone system billing database, called Customer Record Information System (CRIS), to obtain caller information, including zip code. The zip code, in turn, can be used to access a commercially available census data base (e.g., CACI) to provide further demographic information. For example, demographics for a given zip code may include median age and median income. Report statistics can match these demographics with the number of calls received as collected at the ISCP.

The calling party number may be supplied through Caller ID or ANI transmission. If this information is available only for calls within a telephone company Local Access and Transport Area (LATA), reports may include detailed breakdowns of such calls while categorizing out of LATA calls in more general breakdowns. Detailed zip code results can include number and percentage of residential calls, business calls, homeowners, median income and age. Generalized information may include numbers, averages and percentages of calls in time ranges for days of the week.

In accordance with another aspect of the invention, additional information about each call is obtained through the use of a network intelligent peripheral (IP). The IP is connected to the ISCP through a signalling path interface. The IP also is bridged on each incoming call to the subscriber in a three way voice path with the calling and called party lines, through the subscriber's SSP. The ISCP and the IP cooperate to control interactive collection of data from the calling party at the outset of the call and from the subscriber after the calling party has gone on-hook. If the ISCP determines that the calling party line is a first time caller, a message is sent to the caller seeking permission, by way of DTMF input or voice, to provide caller information to the called, subscriber party. Such information would include the calling line number, obtained from the call transaction data. From this number, the name and address listed for the calling party line, is accessed from the telephone company line identification database (LIDB). After completion of a call by the calling party, the called party subscriber remains connected with the IP. An interactive session then takes place whereby the subscriber supplies information, through DTMF input or voice, of account codes or the like that signify the subscriber's predefined call categories. The information is collected in the DRS through the ISCP.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 is a table exemplifying collected call transaction data according to the present invention.

FIG. 4 is a flow chart showing the handling of calls and collection of call transaction data according to a preferred embodiment of the present invention.

FIG. 5 is a block diagram illustrating the report data and formulation process according to the present invention.

FIGS. 6A–6C are tables exemplifying reports that may be generated by the report processor according to the present invention.

BEST MODE FOR CARRYING OUT THE INVENTION

Figure 1:
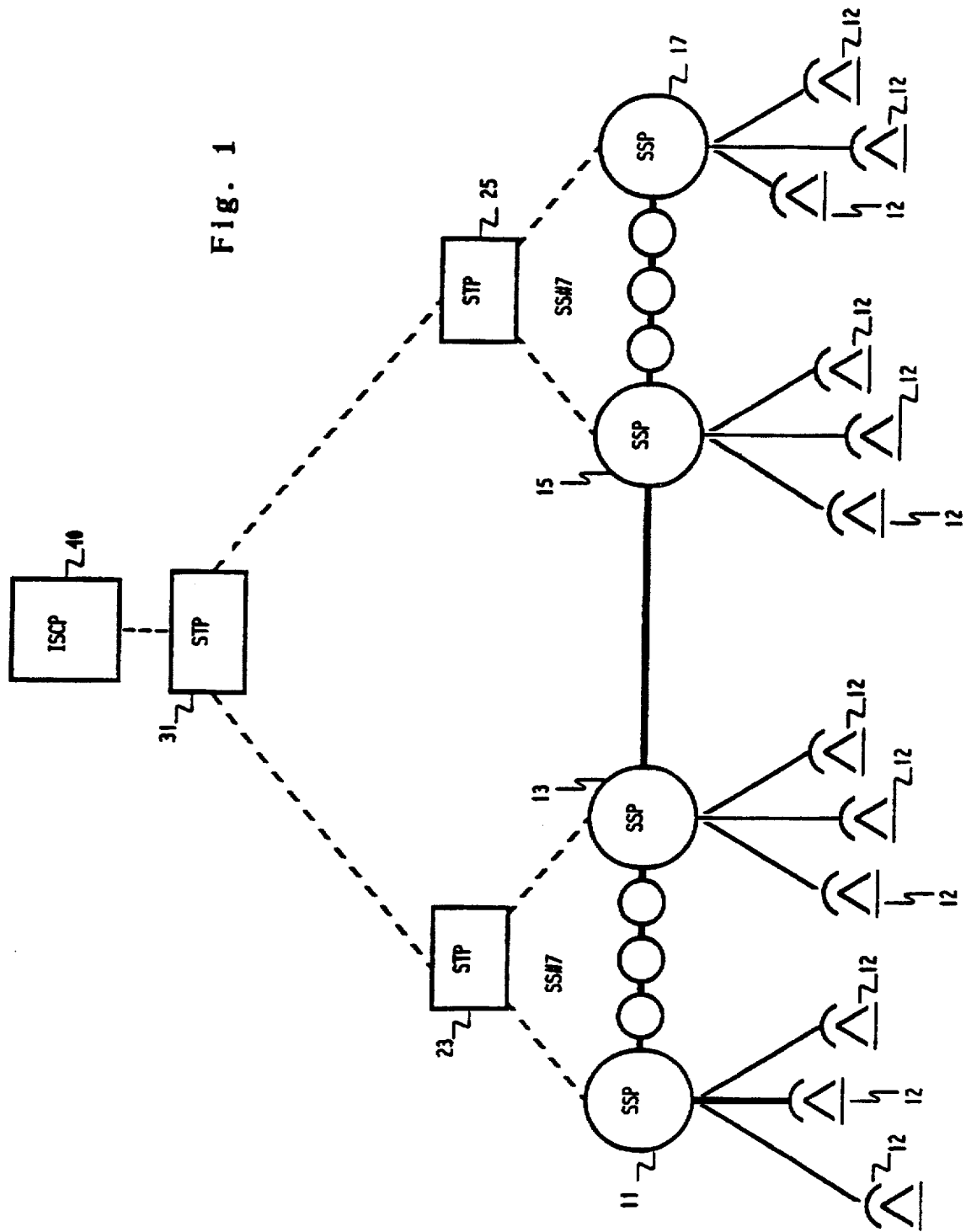
FIG. 1 is a block diagram of the present invention in the context of an Advanced Intelligent Network (AIN)

FIG. 1 is a depiction of the invention in an AIN architectural environment. The figure is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application, Ser. No. 08/248,980, filed May 25, 1994, which is incorporated by reference herein.

The SSP type COs 11 and 13 are shown connected to a first local area STP 23, SSP-COs 15 and 17 being connected to a second local area STP 25. The connections to the STPs are for signalling purposes. Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application, Ser. No. 08/248,980, filed May 25, 1994, for a more detailed description of the AIN network.

Figure 2:
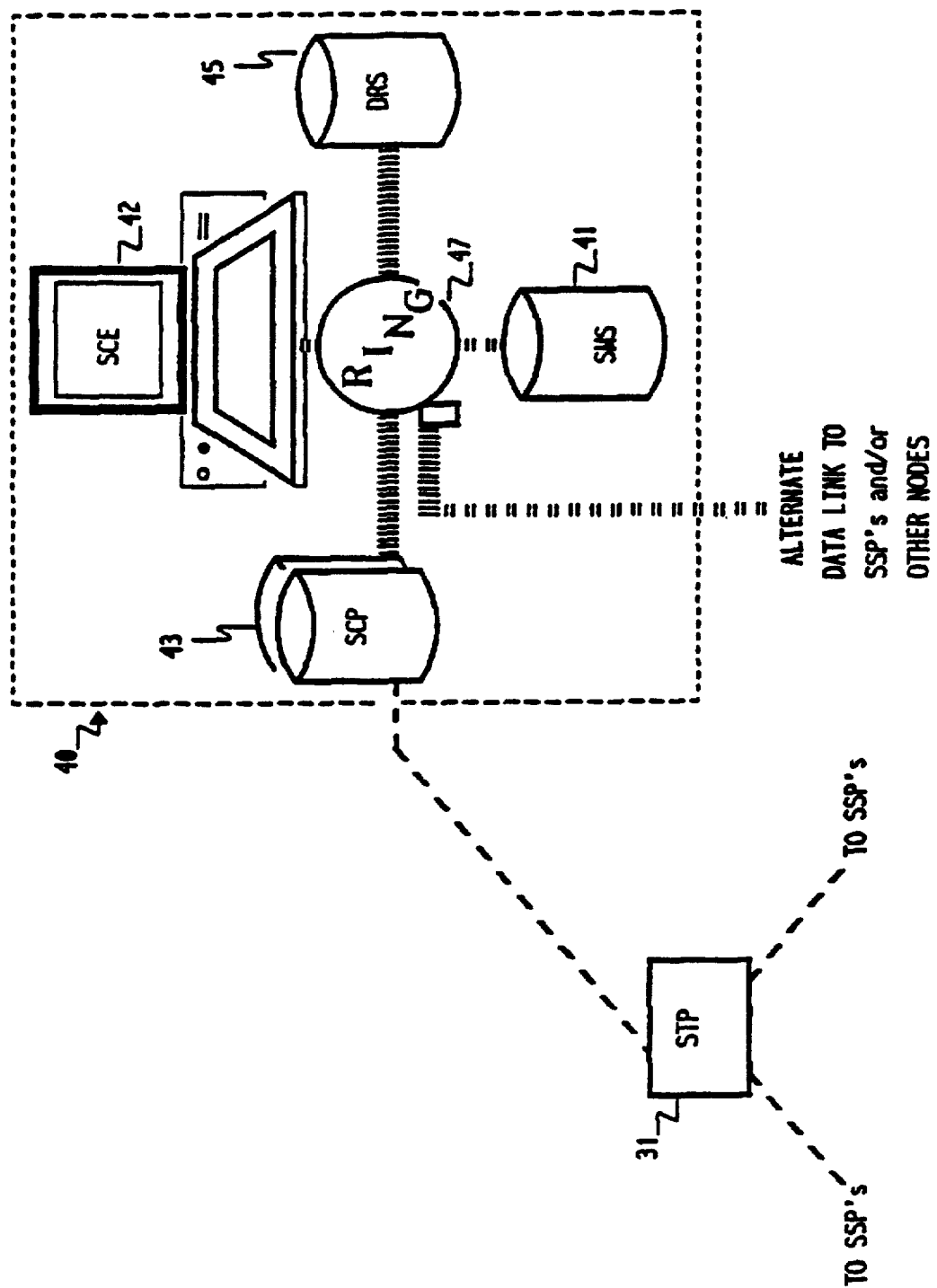
FIG. 2 is a more detailed diagram of the ISCP used in the preferred AIN implementation of the present invention.

The ISCP 40 is an integrated system shown in more detail in FIG. 2. Among other system components, the ISCP 40 includes a Service Management System (SMS) 41, a Data and Reporting System (DRS) 45 and the actual database referred to as a Service Control Point (SCP) 43. The ISCP also typically includes a terminal subsystem referred to as a Service Creation Environment or SCE 42 for programming the database in the SCP 43 for the services subscribed to by each individual business customer. The components of the ISCP are connected by an internal, high-speed data network, such as a token ring network 47. Connection to this ring is made to serve as an alternate data link to SSPs and other nodes, such as a report processor.

In the AIN network system, certain calls receive specialized AIN type processing under control of data files stored in the SCP database 43 within the ISCP 40. Such files contain call processing records (CPRs) associated with respective AIN subscribers. Information contained in the CPRs relate to the AIN service or services to which the customer subscribes. The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the SCP database for instructions.

In accordance with the present invention, tracking of call transaction data is performed through AIN functions. To enroll a subscriber in this service, a CPR is established in the SCP 43 by means of the SCE 42. The CPR indicates that call transaction data is to be collected and stored in DRS 45. The switch translation table is set at the subscriber's SSP to include a terminating attempt trigger for calls placed to the subscriber. A terminating attempt trigger is distinguished from an origination trigger in that the former is used to activate AIN functionality for incoming calls that are placed to a subscriber line associated with the SSP in which the trigger is set. An origination trigger, on the other hand, is set to activate AIN functionality for outgoing calls placed from a subscriber line associated with the SSP. Terminating attempt trigger functionality is provided for in version 0.1 of AIN.

FIG. 3 is an example of a table stored in the DRS 45 that includes collected call transaction data. Data for each triggered call includes terminating call number, originating call number, date and time of which the call was placed. The originating call number information is obtained from ANI or caller ID identification. Additional information may be included, such as whether the call was answered and the duration of the completed call.

Operation of the system depicted in FIGS. 1 and 2 with respect to handling of calls and collection of call transaction data may be explained with reference to the flow chart shown in FIG. 4. As an example, a particular subscriber may be assumed to have an advertised telephone number associated with a station 12 connected by a subscriber line to SSP 11. The SSP contains the switch translation tables for the subscriber line that indicate a termination trigger for incoming calls to the subscriber station 12 that may originate from any station within the AIN network or from more remote locations.

The SSP, upon detection of a trigger at step 101, will suspend call processing, compile a TCAP formatted call data message and forward that message via a common channel interoffice signalling (CCIS) link and STP(s) to the ISCP 40 that includes the SCP database 43, at step 103. Call transaction data is conventionally included in TCAP messaging. The ISCP will access the subscriber's CPR stored in SCP 43 at step 105 to determine what AIN treatment is to be applied to the suspended call. In accordance with instructions derived from the CPR, the ISCP will extract call transaction data from the TCAP message at step 107. At step 109, this data will be stored as one record, having fields corresponding to the table headings of FIG. 3, in DRS 45, step 109. Upon completion of this task, the ISCP will formulate a TCAP message, step 111, instructing the SSP to resume processing the call to connect with the subscriber destination as originally dialed. At step 113, the SSP will resume call processing.

A trigger will be set in the switch translation table of each subscriber of the service that is associated with SSP 11. SSP 11 will determine, in the above described manner, whether a trigger exists for each of the incoming calls that is to terminate to a station served by that SSP. Similarly, other SSPs of the AIN network will perform the same functions. The DRS database table, as depicted in FIG. 3, over time thus will contain a plurality of records for all subscribers of the service.

Storage of this call transaction data in the DRS frees up SCP memory to be used primarily for storage of CPR records. As an alternative to the operation outlined in FIG. 4, the SCP may be used to store call transaction data temporarily as calls are being processed. The stored call transaction data can periodically be downloaded, for example at thirty minute intervals, to the DRS to free memory capacity in the SCP. This alternative operation may increase call processing speed during heavy traffic conditions.

The accumulated call transaction data are used to generate statistical reports. Reports may be produced periodically at such times as, for example, issuance of a subscriber's telephone bill. Alternatively, reports can be generated in accordance with the subscriber's preference as to time period covered and report generation schedule.

FIG. 5 is a block diagram illustrating the report data and formulation process. ISCP 40 periodically transmits the call transaction data captured in the DRS report processor 51. The report processor may comprise a PC or a more general purpose computer, such as an IBM RS-6000 and has the capacity to store the received data. While this received data can and will be used to generate records indicating statistical usage, additional information is derived therefrom by the report processor. The report processor will access the telephone company billing database 55, called Customer Record Information System (CRIS). Using the originating phone number of each record, information stored in CRIS, including zip code, is obtained for each caller. The zip code, in turn, is used to access a commercially available census database 53, for example, CACI, to provide further demographic information. With such information, the processor can generate standardized reports setting forth statistics for all incoming calls during the report period as well as reports that are specialized in content and format to individual subscriber specifications.

FIGS. 6A–6C are examples of reports that may be generated by the report processor. FIGS. 6A and 6B respectively are tables showing incoming call statistics by day of week and time of day. With such results, a subscribing advertiser can evaluate the effectiveness of advertising promotions and anticipate busy periods. The statistics of these tables can be derived directly from data received by the report processor from the ISCP.

FIG. 6C is an example of a report table that contains information derived from additional databases. The zip code of each caller identified in the call transaction data is derived from the CRIS database. Demographics for a given zip code is obtained from the census database. Report statistics can match these demographics with the number of calls received as collected at the ISCP. As illustrated in the table, the subscriber may then be given report information by zip code, such as the number and percentage of residential and business calls, percentage of calls from home owners, the median household age and income for all incoming calls during the report period.

Figure 7:
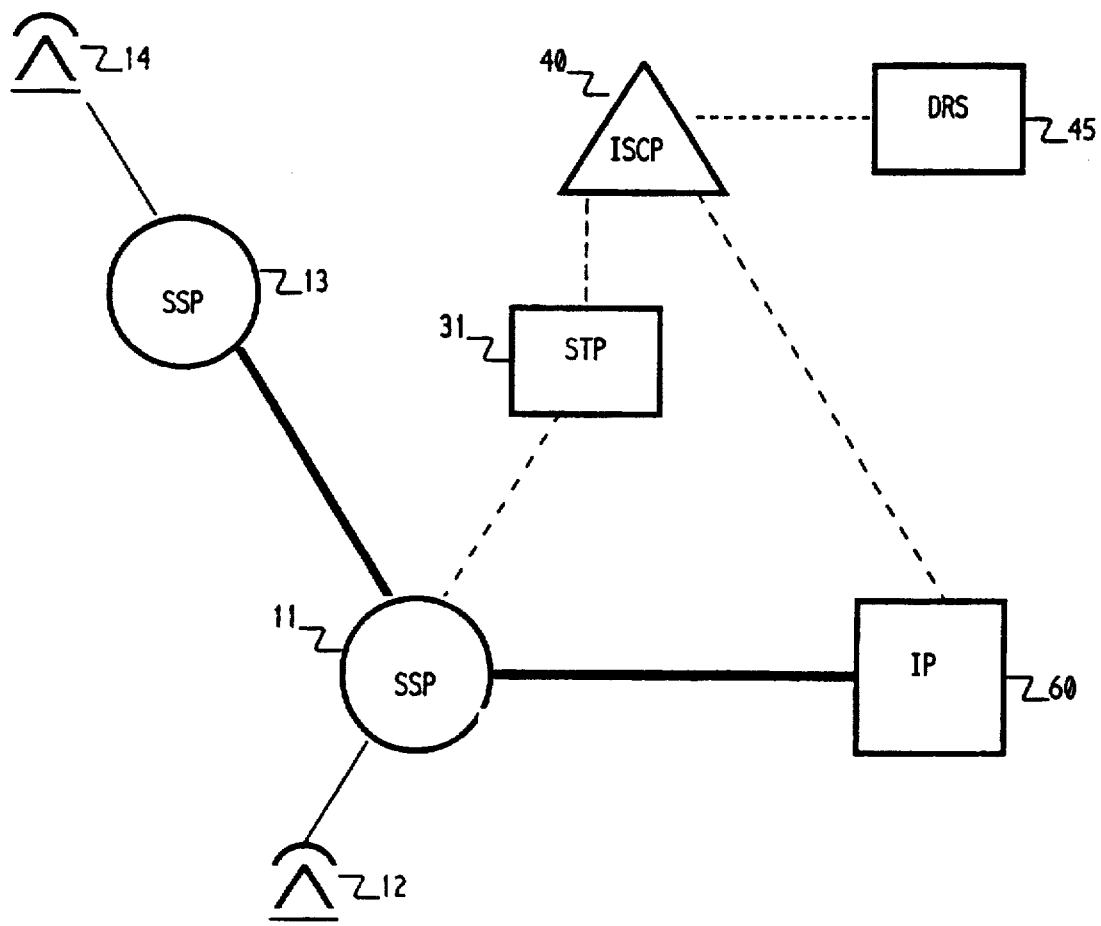
FIG. 7 is a partial block diagram of a further embodiment of the present invention.

FIG. 7 is a diagram of a further embodiment of the present invention that includes a network intelligent peripheral. To simplify explanation, only a portion of the network shown in FIGS. 1 and 2 is depicted with appropriate modification. Intelligent peripheral (IP) 60 is connected by data transmission paths to ISCP 40. A preferred data transmission interface is a modified version of that published in Bellcore document TA-NWT-001129, known as "1129+" protocol. The IP is an advanced network platform that contains at least one powerful general purpose computer. Reference is again made to commonly assigned copending application Ser. No. 08/248,980, filed May 25, 1994, for a detailed description of the intelligent peripheral and 1129+ protocol. Other data transmission protocols may be substituted for 1129+ as interfaces for signaling between the IP and the ISCP.

The IP interacts with the ISCP through the common channel signaling portion of the network, i.e., data transmission paths, as indicated by the dashed line connections. These paths also interconnect the various SSPs, STPs and ISCPs in the AIN network. For clarity of illustration, FIG. 7 is simplified to show only those elements of the network that exemplify a typical call flow process according to this embodiment of the invention. Common channel signalling paths thus are shown among SSP 11, STP 31, ISCP 40, DRS 45 and IP 60. DRS 45 may be located remotely from the ISCP 40, as depicted in the figure, or included therein.

The IP is also connected to the voice portion of the telecommunications network. A voice path is shown connected between the IP 60 and SSP 11, which is associated with the subscriber's local loop that includes station equipment 12. The term "subscriber" in this sense is exemplified by the yellow pages advertiser to whom calls are placed. A caller at station 14 originates a call to the subscriber through the caller's SSP 13 and SSP 11. Incoming calls, of course, can be routed from any network originating point through various alternative network switches. Similarly, the IP may be directly connected with switches other than SSP 11. Connection to the IP may be made, for example, through Centrex lines.

Figure 8A:
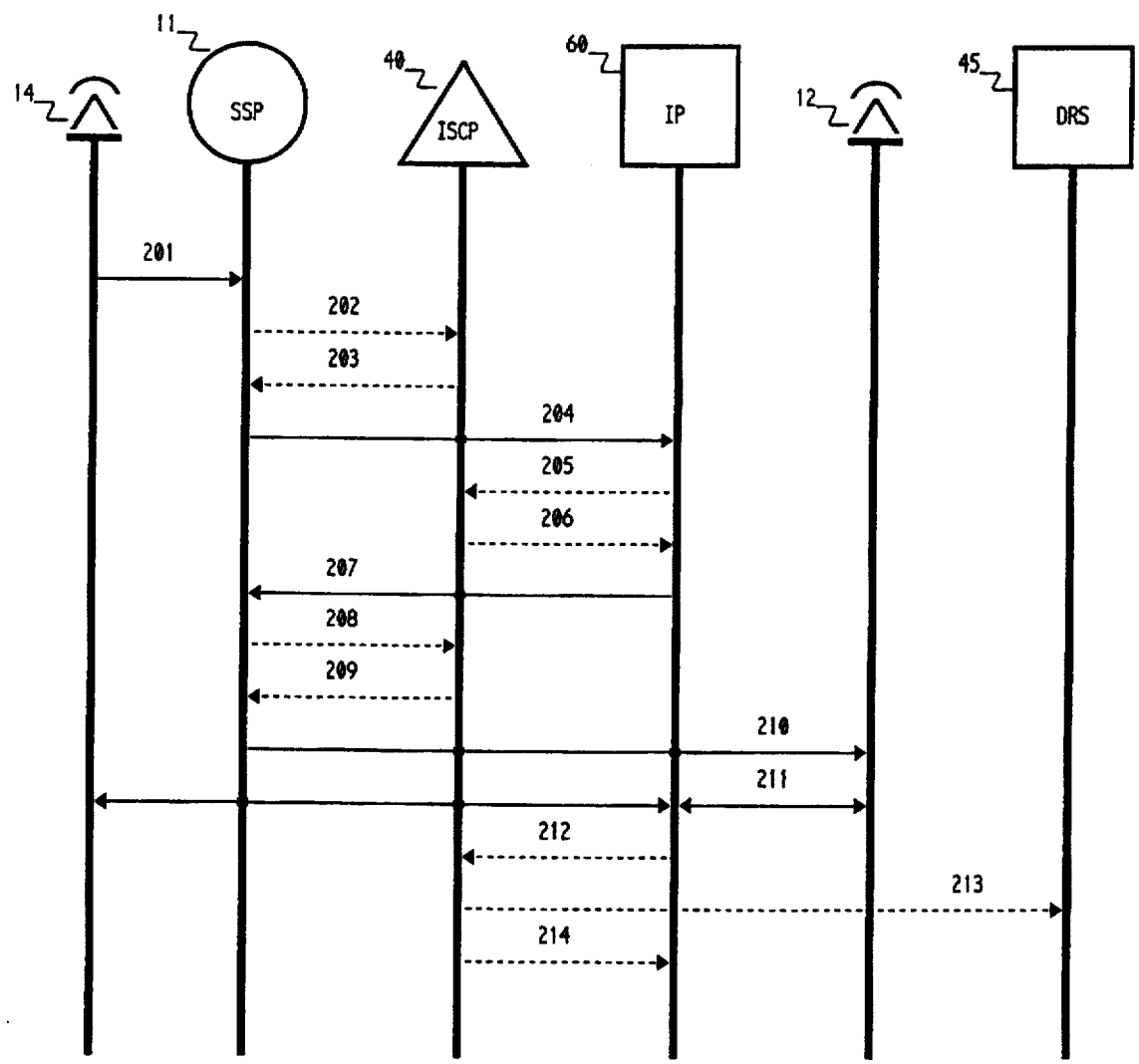
FIG. 8A is a call flow diagram illustrating the order of call processing in the embodiment of FIG. 7.

FIG. 8A is a call flow diagram that describes operation of the embodiment of FIG. 7 in sequential order. At step 201, a caller 14 initiates a call to the subscriber 12 through the caller's SSP 13. SSP 11 encounters a terminating attempt trigger associated with the called party subscriber and initiates signaling communication with the ISCP 40. Step 202 indicates transmission of query messages from the SSP to the ISCP, while 203 indicates response messaging from the ISCP to the SSP.

Figure 8B:
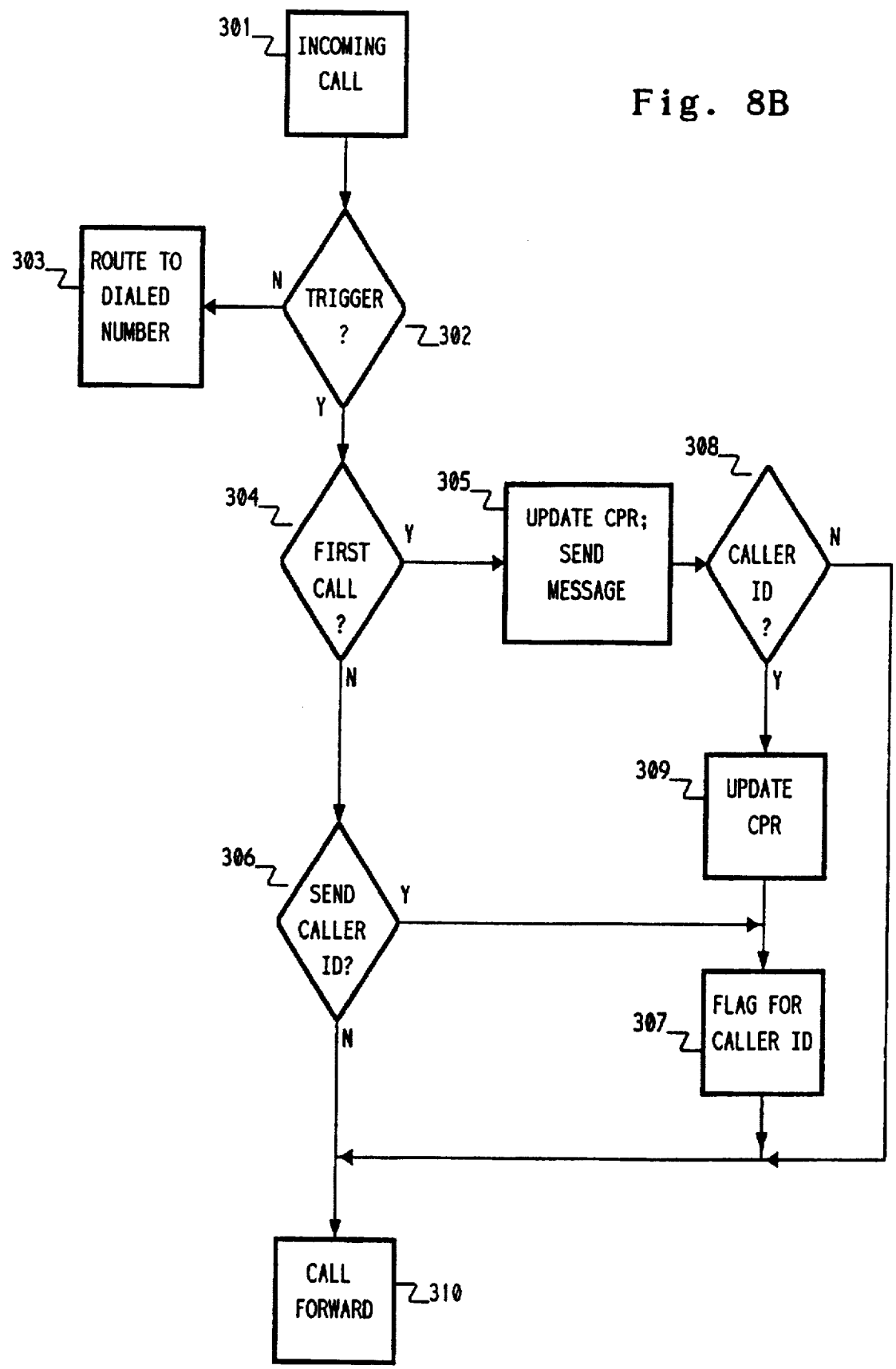
FIG. 8B is a flow chart depicting the initial portion of the call processing operation of the embodiment of FIG. 7.

Processing of the call to this point is illustrated by the flow chart of FIG. 8B. A call is placed to the subscriber at step 301. The called party SSP 11 determines at step 302 whether a terminating attempt trigger is recognized. If not, the call is completed to the dialed number in a routine manner, step 303. If a terminating attempt trigger is recognized at step 302, call routing is suspended while the ISCP is accessed to determine whether the call is the first call to have been placed to the called party subscriber from the calling party line, at step 304. If so, the ISCP sends a message to the SSP instructing transmission of a welcome announcement to the calling party. The announcement, transmitted in step 305, requests a response from the caller, either by DTMF input or voice, as to whether the caller agrees to forwarding the calling number for this and future calls to the called party subscriber.

The determination at step 304 is made by accessing the subscriber's CPR at the ISCP. The CPR table will contain a field indicating that the announcement is not to be sent if the calling party number is listed in the field. The list contains numbers of previous calling parties. If the calling party number matches a number on the list, the announcement will not be played to the caller.

If the call is not from a first time calling line, as determined at step 304, then the subscriber's CPR is checked by the ISCP to determine whether permission has been given in an earlier call to forward the calling number with the other call transaction information, at step 306. If so, the ISCP will flag the call transaction to indicate that the DRS is to be updated accordingly, at step 307. In either case, processing of the call will then resume with a forward call response message sent by the ISCP to the SSP at step 310.

If an announcement is sent at step 305, the subscriber's CPR is updated at that time to now include the calling party number on the list as no longer a first time caller. A determination is then made at step 308 of whether the first time caller has opted to include calling party information. If so, the subscriber CPR will be updated to so indicate and the call will be flagged at step 307. In either case, processing of the call will then resume at step 310.

With reference again to FIG. 8A, at step 204 the SSP routes the call to the IP. The IP is programmed to defer to the ISCP for instructions when incoming calls are received. At step 205 the IP sends an Invoke Provide Instructions Query to the ISCP over the 1129+ interface. The ISCP responds at step 206 with a Switch Info to Resource message that contains the called party subscriber number. The IP can then function in accordance with the particular requirements of the subscriber as pre-established in the IP program.

At step 207 the IP establishes a call to the subscriber. A terminating attempt trigger is again encountered by the SSP, which then queries the ISCP at step 208. The ISCP determines that the caller this time is the IP and sends an "Authorize Termination" response message to the SSP at step 209. This message instructs the SSP to route the call in from the IP to the subscriber, which is performed at step 210. The IP then initiates bridging of this call with the suspended initial call from station 14 by simulating a hook flash procedure. Step 211 is indicative of this three way conference connection.

During the conference call portion, the IP serves a monitoring function. Interaction, either live or automated, occurs between the calling party and the called subscriber station. The subscriber station may be provided with a front end gateway wherein a menu is played to the caller seeking a DTMF selection. For example, the caller can be requested to input "one" if the purpose of the call is for information, "two" if the purpose of the call is to purchase, and so on. With appropriate voice recognition equipment, the caller's selection may be made by voice response.

The IP, which stays on-line during the call, monitors the line for an on-hook condition by the calling party. Upon detection of such condition, the IP will prompt the subscriber for an account code. Account codes are specific to each subscriber and predetermined by the subscriber. The codes can be multiple digit numbers that identify particular items or services that the subscriber has determined should be noted. For example, an account code may represent a particular product and/or department of the subscriber's business that was the subject of the call. Great flexibility is permitted in defining the account codes, which may be coordinated with the front end gateway menu earlier described.

After receiving the subscriber's account code input for the call the IP sends an Invoke Provide Instructions Query to the ISCP, which then receives and records the call details received from the IP at step 212. The ISCP then passes call details to DRS 45 for processing at step 213. At step 214 the ISCP sends the IP a Cancel Resource event message to terminate the call.

Information is accumulated by the DRS for report generation preferably in the manner described earlier with respect to FIG. 5. The reports generated in the embodiment of FIG. 7 are more robust as they contain additional information obtained from the account codes and front end gateway menu responses. The report processor will access appropriate data bases, such as the telephone company LIDB data base, to identify by name and address those first time callers that have opted to supply caller information to the subscribers. With such information included in the report, the subscriber can update mailing lists.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, as identification of a calling party number may be supplied through Caller ID or ANI transmission, reports may include detailed breakdowns of calls originating within the subscriber's LATA, while out of LATA calls may be presented in more general breakdowns, such as those of the tables of FIGS. 6A and 6B. For subscribers who advertise in several area yellow pages, incoming calls can be broken down in the report according to the regional yellow pages books associated therewith.

Calls originating from remote locations may be transmitted through interexchange carriers with Feature Group D inband signaling. Such signaling will contain billing information that identifies the calling party. Incoming calls of this nature, which may be routed through a tandem, would be recognized by the terminating SSP. Calling party identification information will be stripped from the inband signaling and included in the TCAP message sent to the ISCP. In an additional variation of the invention, interaction with the ISCP need not originate from the subscriber's end office but may, for example, be initiated by the SSP at the point of presence of the interexchange carrier for the incoming call.

We claim:

1. In a public switched telephone network comprising a plurality of subscriber telephone lines, each coupled to an associated telephone switching facility, each subscriber telephone line having at least one directory number, a method for processing an incoming telephone call placed to a predetermined directory number comprising the steps of:

detecting, at a switching facility associated with said predetermined directory number, a call having said predetermined directory number telephone line as its destination;

identifying the directory number of the line originating the detected call;

determining whether a call has previously been completed to the predetermined number destination from said originating line; and subsequent to said determining step, completing the call through said switching facility to said destination.

2. A method as recited in claim 1, wherein said step of determining comprises comparing the identified directory number with a list of directory numbers of previous callers and said method further comprises the step of adding said identified directory number to said list if no match has resulted in the comparison step.

3. In a public switched telephone network comprising a plurality of subscriber telephone lines, each coupled to an associated telephone switching facility, each subscriber telephone line having at least one directory number, a method for processing incoming telephone calls placed to a predetermined directory number comprising the steps of:

detecting, at a switching facility associated with said predetermined directory number prior to call completion, a call having said predetermined directory number telephone line as its destination;

identifying the directory number of the line originating the detected call;

determining whether the predetermined number destination has previously been called by said originating line, said step of determining comprising comparing the identified directory number with a list of directory numbers of previous callers;

routing the call to said destination;

adding said identified directory number to said list if no match has resulted in the comparison step; and transmitting a message to the originating line if no match has occurred in the comparison step.

4. A method as recited in claim 3, wherein said message comprises a query and said method further comprises storing a response to said query.

5. A method as recited in claim 4, wherein, in response to a positive response to said query, said method additionally comprises supplying caller information to the subscriber of said predetermined number.

6. A method as recited in claim 5, wherein said step of supplying comprises:

recording the directory number of the originating line;

accessing a database using the recorded directory number to retrieve said caller information; and reporting said information to the subscriber.

7. A method as recited in claim 5, further comprising:

accessing a previously stored response from said calling line directory number if a match resulted in said comparison step; and supplying caller information to the subscriber of said predetermined number if said accessed response is positive.

8. A method as recited in claim 1, wherein said step of identifying comprises correlating incoming calls with destination subscriber telephone lines at said associated telephone switching facility and temporarily suspending processing of calls placed to said predetermined directory number destination.

9. In a communication network including a plurality of interconnected central office switching systems each at a different location, each of said central office switching systems comprising a Service Switching Point (SSP) connected to a plurality of local communication lines each associated with at least one directory number, a voice network portion comprising voice communication paths for interconnecting any of the central office switching systems, a common channel signaling network portion comprising signaling paths interconnecting said central office switching systems through at least one Signal Transfer Point (STP) and an Integrated Services Control Point (ISCP) including a Data and Reporting System (DRS) database, a method for evaluating calls placed to the communication network, comprising the steps of:

setting a terminating attempt trigger for a predetermined directory number at an SSP associated therewith;

temporarily suspending processing of each call placed to the destination of said predetermined directory number in accordance with said terminating attempt trigger;

identifying the directory number of the line originating the suspended call;

determining whether a call has previously been completed to the predetermined number from said originating line, and subsequent to said determining step, completing the call through said SSP to said destination.

10. A method as recited in claim 9, wherein said step of determining comprises:

transmitting a data message from said associated SSP to said ISCP;

accessing a call processing record (CPR) associated with said predetermined directory number at the ISCP;

comparing the identified directory number with a list of directory numbers of previous callers in said CPR.

11. A method as recited in claim 10 further comprising a step of adding said identified directory number to said list if no match has resulted in the comparison step.

12. In a communication network including a plurality of interconnected central office switching systems each at a different location, each of said central office switching systems comprising a Service Switching Point (SSP) connected to a plurality of local communication lines each associated with at least one directory number, a voice network portion comprising voice communication paths for interconnecting any of the central office switching systems, a common channel signaling network portion comprising signaling paths interconnecting said central office switching systems through at least one Signal Transfer Point (STP) and an Integrated Services Control Point (ISCP) including a Data and Reporting System (DRS) database, a method for evaluating calls placed to the communication network, comprising the steps of:

setting a terminating attempt trigger for a predetermined directory number at an SSP associated therewith;

temporarily suspending processing of each call placed to the destination of said predetermined directory number in accordance with said terminating attempt trigger;

identifying the directory number of the line originating the suspended call;

determining whether the predetermined number has previously been called by said originating line, said determining step comprising:

transmitting a data message from said associated SSP to said ISCP;

accessing a call processing record (CPR) associated with said predetermined directory number at the ISCP; and comparing the identified directory number with a list of directory numbers of previous callers in said CPR;

routing the call to said destination;

adding said identified directory number to said list if no match has resulted in the comparison step; and transmitting a message to the originating line if no match has occurred in the comparison step.

13. A method as recited in claim 12, wherein said message comprises a query and said method further comprises storing a response to said query in the ISCP.

14. A method as recited in claim 13, further comprising a step of generating a report containing caller information in response to a positive response to said query.

15. A method as recited in claim 14, wherein said step of generating comprises:

storing the directory number of the originating line;

accessing a database using the stored directory number to retrieve said caller information; and reporting said information to the subscriber of the predetermined directory number.

16. A method as recited in claim 14, further comprising the steps of:

accessing a response from said calling line directory number previously stored in said CPR, in response to a match in said comparison step; and generating a report containing caller information if said accessed response is positive.

17. In a communication network including a plurality of interconnected central office switching systems each at a different location, each of said central office switching systems comprising a Service Switching Point (SSP) connected to a plurality of local communication lines each associated with at least one directory number, a voice network portion comprising voice communication paths for interconnecting any of the central office switching systems, a common channel signaling network portion comprising signaling paths interconnecting said central office switching systems through at least one Signal Transfer Point (STP), an Integrated Services Control Point (ISCP) connected to said common channel signaling network portion and including a Data and Reporting System (DRS) database, and an intelligent peripheral (IP) connected to both said voice network portion and said common channel signaling network portion, a method for evaluating calls placed to the communication network, comprising the steps of:

setting a terminating attempt trigger for a predetermined directory number at an SSP associated therewith;

temporarily suspending processing of each call placed to the destination of said predetermined directory number in accordance with said terminating attempt trigger;

bridging the suspended call in a multiple call connection among the caller line, the called line associated with said predetermined directory number, and the IP;

detecting an on-hook condition of said caller line; and in response to said detection of said on-hook condition, conducting an interactive session between said called line and said IP.

18. A method as recited in claim 17, wherein the conducting step comprises receiving account code information by said IP from the called line, corresponding to predefined account codes relating to the substance of the call.

19. A method as recited in claim 18, wherein said account code information is provided by DTMF input at the called line.

20. A method as recited in claim 18, wherein said IP comprises a voice recognition processor and said account code information is provided by voice input at the called line.

21. A method as recited in claim 18, and further comprising the steps of:

transmitting said information from said IP to said ISCP;

storing information transmitted to said ISCP for each call placed to said predetermined directory number; and generating a statistical report relating call information stored for calls placed to said predetermined directory number during an established time period.

22. A method as recited in claim 17, and further comprising the steps of:

identifying the directory number of the line originating the suspended call;

transmitting a data message from said associated SSP to said ISCP;

accessing a call processing record (CPR) associated with said predetermined directory number at the ISCP; and comparing the identified directory number with a list of directory numbers of previous callers in said CPR to determine whether the predetermined number has previously been called by said originating line.

23. A method as recited in claim 22, and further comprising the steps of:

adding said identified directory number to said list if no match has resulted in the comparison step;

transmitting a message to the originating line if no match has occurred in the comparison step, said message requesting authorization to transmit caller information to the called party;

storing a response to said message in the ISCP CPR; and adding caller information to said report for all calls placed to said predetermined number during said established time period for which the CPR contains a positive response.

* * * * *